United States Patent
Koutrika et al.

(10) Patent No.: US 9,342,301 B2
(45) Date of Patent: May 17, 2016

(54) CONVERTING AND INPUT SCRIPT TO A NATURAL LANGUAGE DESCRIPTION

(71) Applicant: HEWLETT-PACKARD DEVELOPMENT COMPANY, L.P., Houston, TX (US)

(72) Inventors: Georgia Koutrika, Palo Alto, CA (US); Craig Peter Sayers, Menlo Park, CA (US); Alkiviadis Simitsis, Santa Clara, CA (US); Alejandro Guerrero Gonzalez, Palo Alto, CA (US); David Alan Tamez Cantu, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 469 days.

(21) Appl. No.: 13/922,554

(22) Filed: Jun. 20, 2013

(65) Prior Publication Data
US 2014/0379322 A1  Dec. 25, 2014

(51) Int. Cl.
*G06F 17/28* (2006.01)
*G06F 9/44* (2006.01)

(52) U.S. Cl.
CPC ... *G06F 8/73* (2013.01); *G06F 8/36* (2013.01)

(58) Field of Classification Search
CPC ....................................................... G06F 8/73
See application file for complete search history.

(56) References Cited

U.S. PATENT DOCUMENTS 5,321,606 A * 6/1994 Kuruma .................. G06F 8/427
              704/9
2012/0203782 A1  8/2012 Olston et al.

OTHER PUBLICATIONS

"Good Way to Do Inline Documentation on Pig Scripts".
Alkis Simitsis, et al.; "Optimizing analytic data flows for multiple execution engines"; 2012; SIGMOD; Scottsdale, Arizona.
Andreas Kokkalis, et al.; "Logos: A System for Translating Queries into Narratives"; 2012; SIGMOD; Scottsdale, Arizona.
Danaparamita, J. et al, "QueryViz: Helping Users Understand SQL Queries and their Patterns", Mar. 22-24, 2011.
Georgia Koutrika, et al.; "Explaining structured queries in natural language"; 2010; ICDE.
Pig: Apache Pig; http://pig.apache.org/.
Suresh Thummalapenta, et al.; "Parseweb: A programmer assistant for reusing open source code on the web"; Nov. 2007; ASE; Atlanta, Georgia.
Timothy C. Lethbridge, et al.; "How software engineers use documentation: The state of the practice"; 2003; IEEE Computer Software Society.

* cited by examiner

*Primary Examiner* — Asher Kells
(74) *Attorney, Agent, or Firm* — Fabian VanCott (57) ABSTRACT

Converting an input script includes obtaining an input script comprising at least one variable, obtaining at least one translation transformation rule from a library, converting the input script into a tree representation, folding the tree representation to hide a subset of variables in the input script to create a folded tree, and generating a natural language text by applying at least one translation transformation rule from the library to the folded tree.

15 Claims, 11 Drawing Sheets

CONVERTING AND INPUT SCRIPT TO A NATURAL LANGUAGE DESCRIPTION

BACKGROUND

Scripting languages are used to create input scripts, such as Pig scripts. A Pig script may include a number of computer programming statements used to create MapReduce tasks. Pig scripts can be stored in a database for reuse.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

A user may publish an input script, such as a Pig script; in a catalog of scripts such that the input script may be discovered and used by users who may not themselves have expertise with the particular scripting language. However, sharing and re-using input scripts that have been written for performing the same or similar computations and tasks is hindered by the lack of an appropriate method to catalog input scripts. For example, the input scripts are designed to be interpreted by a machine and lack any natural language description of their functionality. As a result, the input script may not be easy to read by a user not familiar with a scripting language.

Further, searching for input scripts based on the syntax and programming constructs inside an input script is very difficult. As a result, a user may provide a description for each input script in the catalog to aid other users in searching for a particular input script. This can be burdensome for the user. Further, the description the user provides may be at an arbitrarily high or complex level. As a result, finding an input script that performs a task or particular computation may be dependent on the quality of the provided description.

The principles described herein include a method for converting an input script. Such a method includes obtaining an input script comprising at least one variable, obtaining at least one translation transformation rule from a library, converting the input script into a tree representation, folding the tree representation to hide a subset of variables in the input script to create a folded tree, and generating a natural language text by applying at least one translation transformation rule from the library to the folded tree. The resulting natural language descriptions may be easily read by humans and can be searched using familiar techniques for searching textual content. Thus, such a method allows a user to quickly and easily find relevant input scripts written by other users. Further, the descriptions of the input scripts can be written in a human readable form that does not require expertise in the particular scripting language. As a result, the input script may be made accessible to a user not familiar with a scripting language.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
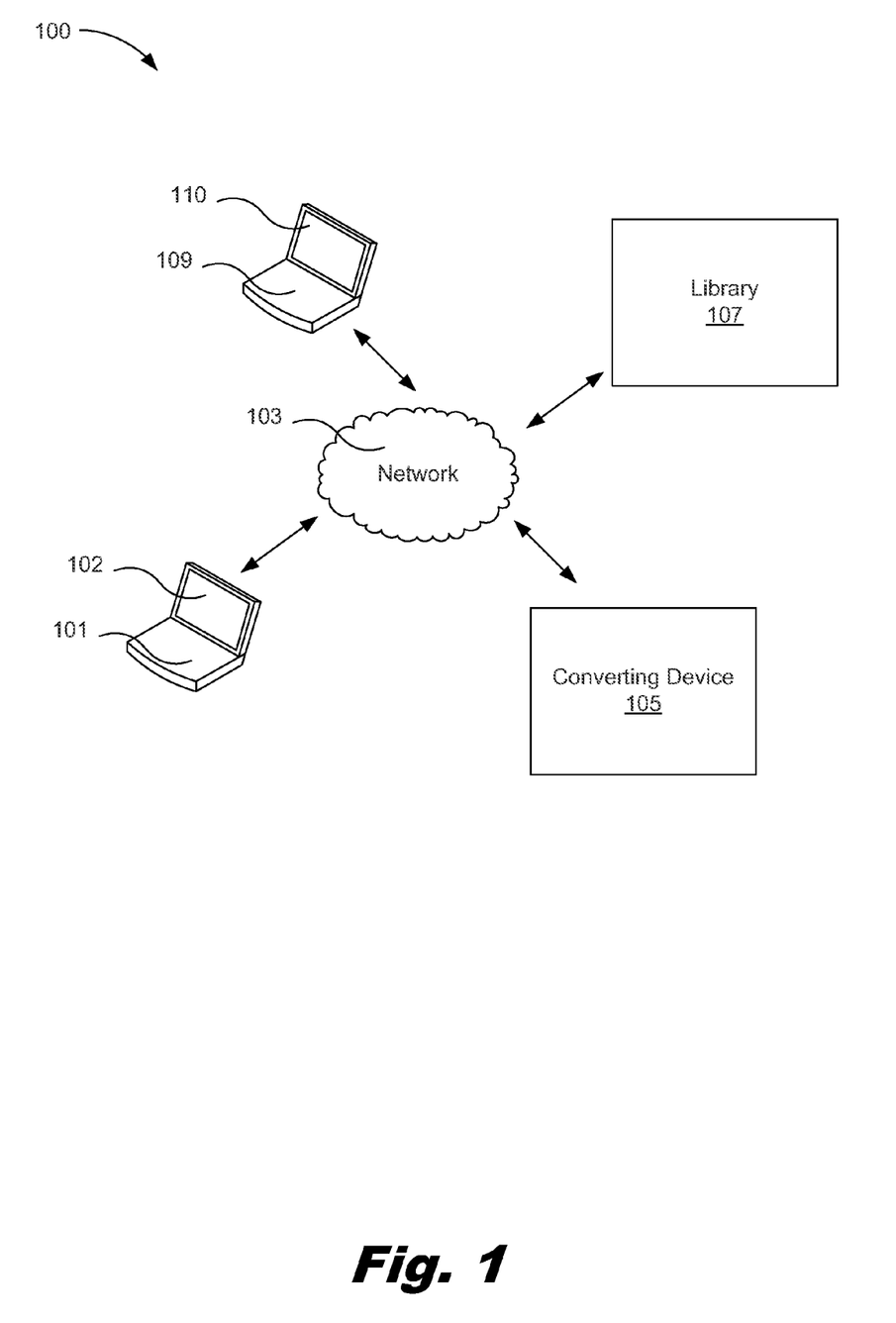
FIG. 1 is a diagram of an example of a converting system according to the principles described herein.

FIG. 1 is a diagram of an example of a converting system according to the principles described herein. As will be described below, the converting system (100) obtains an input script, containing at least one variable, from a first user device and generates a natural language text by applying at least one translation transformation rule from a library to a folded tree representation of the input script. As a result, the natural language text can be used for subsequent operations.

As mentioned above, the converting system (100) includes a first user device (101) with a display (102). As will be described below and in other parts of the specification, an input script containing at least one variable is obtained from the first user device (101). In one example, a webpage is displayed to a user on the first user device (101) via a display (102). In this example, the webpage allows the user to type the input script into the webpage. Further, a converting device (105) may access the input script on the webpage over a network (103). In another example, a user may provide a web address from which a script can be obtained. Further, the converting device (105) may access the input script on the web address over a network (103). As a result, the converting device (105) obtains an input script containing at least one variable from the first user device (101).

In the example of FIG. 1, the converting device (105) is located over a network (103), however, the converting device (105) may be located on a user device, be distributed across multiple devices, be incorporated in a physical device, be incorporated in a virtual device, be located at another appropriate location, or combinations thereof. As will be described below and in later sections of the specification, the converting device (105) obtains an input script containing at least one variable. As mentioned above, the input script may be obtained from a first user device. The converting device (105) obtains at least one translation transformation rule from a library (107). The converting device (105) then converts the input script into a tree representation. In one example, the tree representation may be a data structure containing a number of nodes that represents the input script. The converting device (105) folds the tree representation to hide a subset of variables in the input script to create a folded tree. Next, the converting device (105) generates a natural language text by applying at least one translation transformation rule from the library (107) to the folded tree. Finally, the converting device (105) sends the natural language text to a second user device (109). In this example, a second user views the natural language text via a display (110) on the second user device (109). More information about the converting device (105) will be described below.

While this example has been described with reference to an input script, the system (100) is well suited to converting inputs scripts written in the Pig language. As mentioned above, a Pig script is a high-level programming language that is used to create MapReduce programs.

Figure 2:
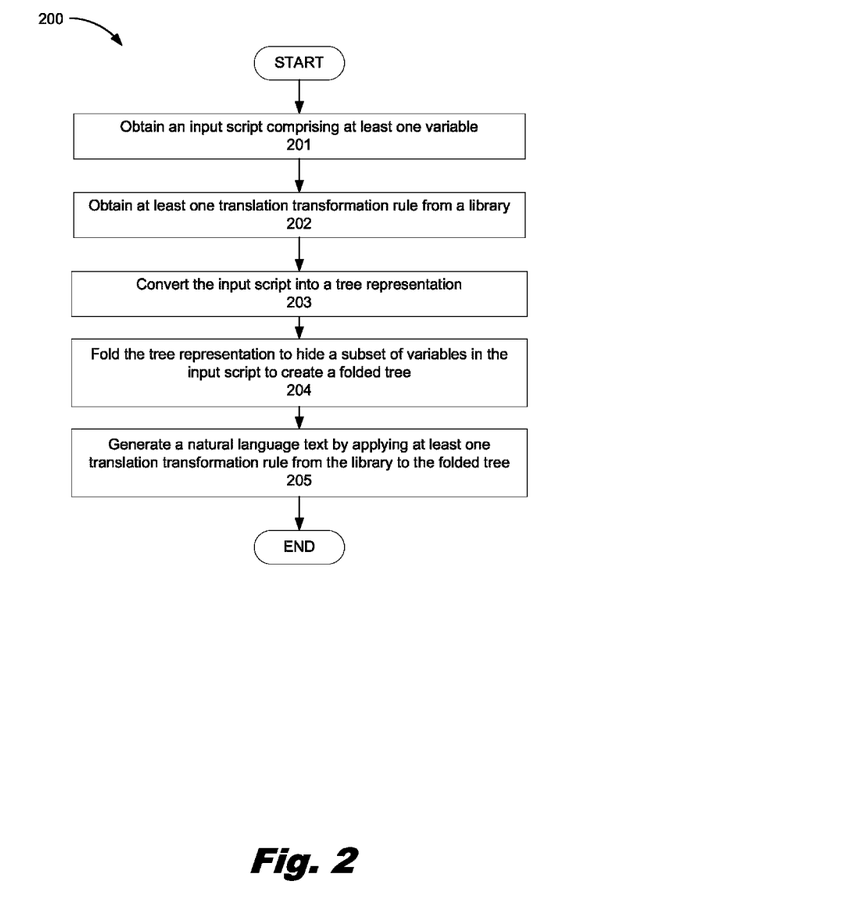
FIG. 2 is a flowchart of an example of a method for converting an input script according to the principles described herein.

FIG. 2 is a flowchart of an example of a method for converting an input script according to the principles described herein. In this example, the method (200) includes obtaining (201) an input script comprising at least one variable, obtaining (202) at least one translation transformation rule from a library, converting (203) the input script into a tree representation, folding (204) the tree representation to hide a subset of variables in the input script to create a folded tree, and generating (205) a natural language text by applying at least one translation transformation rule from the library to the folded tree.

Obtaining (201) an input script comprising at least one variable includes obtaining an input script from a first user device. In one example, a webpage is displayed to a user on the first user device via a display. In this example, the webpage allows the user, using the first user device, to type the input script into the webpage. Further, a converting device may access the input script on the webpage over a network. In another example, a user may provide a web address from which a script can be obtained. Further, the input script may be written in the Pig language. However, an input script may be in any appropriate language that contains variable assignments.

The method further includes obtaining (202) at least one translation transformation rule from a library. As mentioned above, a library contains a number of translation transformation rules. In one example, the translation transformation rules describe how to covert a tree representation of the input script into a natural language text. More information about obtaining at least one translation transformation rule from a library will be described below.

Further, the method can include converting (203) the input script into a tree representation. In one example, converting the input script into a tree representation includes parsing the input script to generate the tree representation. In one example, parsing the input script to generate the tree representation can include starting at a root node and adding one node for each statement in the input script. Further, for each node for each statement, children nodes are added to the tree representation to capture the content of the statement. For example, if a statement is A=10, then one possible tree representation would be to have one node for with a first child node of 'A', and a second child node of '10'. As a result, the parent of '=' is a statement node and its parent is the root node.

While this example has been described with reference to converting an input script with one statement into a tree representation, an input script with any number of statements can be converted into a tree representation. Further, an input script having a complex statement may be divided up into several simpler statements.

As mentioned above, the method includes folding (204) the tree representation to hide a subset of variables in the input script to create a folded tree. In one example, an input script may contain a number of variables that have low utility metric to create a tree representation. In this example, by folding the tree representation, the method (200) can remove a subset of variables that have low utility metric in order to simplify the natural language translations.

In one example, removing variables that have low utility metric, such as variables with names like 'j' or 'k', simplifies the tree representation without losing any significant information from the human-readable translation. For example, an input script contains the following statements:
A=10;
Result=A+1;
In this example, the method (200) can fold away the variable 'A' by replacing each node where 'A' is used with a subtree corresponding to its declaration. In this example, the script becomes a single statement: Result=10+1. As a result, the tree representation is simplified because the folded tree representation contains one less statement and one less assignment operation. This folded tree has one statement to translate into natural language text. As a result, the translation is simpler.

After a tree representation has been folded into a folded tree, the method may continue by generating (205) a natural language text by applying at least one translation transformation rule from the library to the folded tree. In one example, to generate a natural language text, a translation transformation rule that matches part of the folded tree is used and replaces a part of the tree according to the translation transformation rule. For example, a translation transformation rule may be as follows:

<node1> = <node2> → Compute <node2> and store the answer in <node1>

In this example, the translation transformation rule states that any assignment operation from <node2> to <node1> should be translated to the English text, "Compute <node2> and store the answer in <node1>". In keeping with the example given above, applying the translation transformation rule, the statement: Result=10+1; is matched with <node1> being 'Result' and <node2> being the node '+' with children '10' and '1'. In this example, applying the translation transformation rule, the natural language text is, "Compute 10+1 and store the answer in Result" In another example, an additional rule may be used to further fold the tree representation. In this example an additional translation transformation rule may be as follows:
<node1>+<node2>→<node1> plus <node2>
In this example, applying the additional translation transformation rule, the natural language text becomes, "Compute 10 plus 1 and store the answer in Result." Further, an additional rule may include:
'1'→"one"
In this example, applying that additional translation transformation rule, the natural language text becomes: "Compute 10 plus one and store the answer in Result."

In another example, it may be helpful to have additional translations for more specific cases. For example, a translation transformation rule may be as follows:
<node1>=<node2>+1→Increment <node2> and store in <node1> In this example, applying the translation transformation rule, the natural language text may be, "Increment 10 and store in Result."

In another example, a folded tree may have a deeper data structure that has additional translation transformation rule templates that match against the deeper data structure. For example, an input script contains the following script:

```
ordered = ORDER Words BY freq DESC;
TopN = LIMIT ordered 500;
STORE TopN INTO 'output'
```

In this example, applying the translation transformation rule, the natural language text may be, "Computes ordered by sorting Words by freq in descending order, Computes TopN by taking the first 500 of ordered, and Writes out TopN." After folding the tree representation to remove a subset of variables, the tree representation may be represented by a single statement combining both the ORDER and LIMIT operations. As a result, the natural language text may be, "Writes out the top 500 Words."

While the above examples include applying a translation transformation rule to a folded tree, it should be apparent that the order in which the translation transformation rules are applied matters. One technique is to store the translation transformation rules in a list, and give precedence to whichever translation transformation rule is earlier in the list. Further, more sophisticated techniques are possible, for example, the method can apply all alternatives of the translation transformation rules to generate many possible translations, score the translation transformation rules using a utility metric, and choosing the translation transformation rules with the highest utility metric. More information about the utility metric will be described below.

Figure 3:
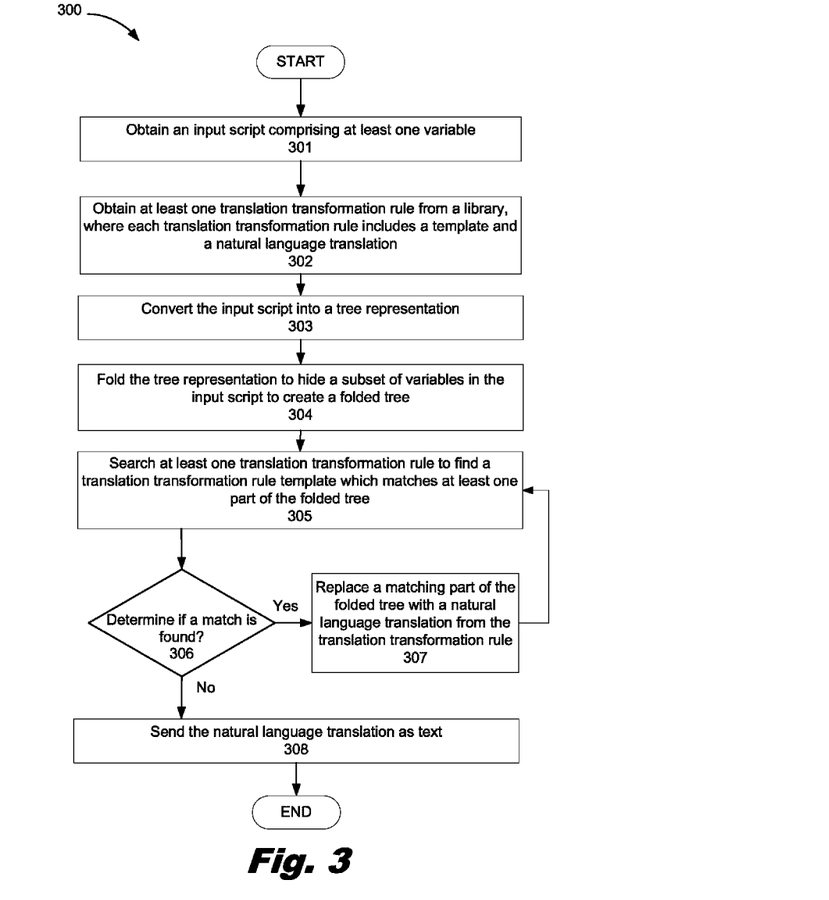
FIG. 3 is a flowchart of an example of a method for converting an input script according to one example of principles described herein.

FIG. 3 is a flowchart of an example of a method for converting an input script according to one example of principles described herein. In this example, the method (300) includes obtaining (301) an input script comprising at least one variable, obtaining (302) at least one translation transformation rule from a library, where each translation transformation rule includes a template and a natural language translation, converting (303) the input script into a tree representation, folding (304) the tree representation to hide a subset of variables in the input script to create a folded tree, searching (305) at least one translation transformation rule to find a translation transformation rule template which matches at least one part of the folded tree, determine (306) if a match is found, replacing (307) a matching part of the folded tree with a natural language translation from the translation transformation rule, and sending (308) the natural language translation as text.

As mentioned above, the method includes searching (305) at least one translation transformation rule to find a translation transformation rule template which matches at least one part of the folded tree. In one example, a translation transformation rule template is stored in memory in a library. As mentioned above, a converting device references a library to find a translation transformation rule template that matches at least one part of the folded tree. Further, in addition to the template each translation transformation rule includes a natural language translation for that matching part of an input script. For example, a library may contain the following translation transformation rule:

(STATEMENT ˆ1 (ORDER ˆ2 ˆ3 DESC)) → (Computes ˆ1 by sorting ˆ2 by ˆ3 in descending order);

To find a translation transformation rule which matches at least one part of the folded tree, the method walks through the tree representation, and at each node for the tree representation, the method (300) checks if there is a translation transformation rule template which matches a subtree of the tree representation starting at that particular node. As a result, the method (300) determines (306) if a match is found.

In one example, if a match is found, the matching part of the folded tree is replaced (307) with a natural language translation from the translation transformation rule. For example, an input script may include the following statement:
 ordered=ORDER Words BY freq DESC;
In keeping with the given example, a subtree of the tree representation may the following:
 (STATEMENT ordered (ORDER Words freq DESC));
In this example, a translation transformation rule matches that subtree of the tree representation. As a result, a natural language translation from the translation transformation rule may be, "Computes ordered by sorting Words by freq in descending order."

Finally, the method includes sending (308) the natural language translation as text. In one example, the natural language translation is sent as text to a second user using a second user device. In this example, a second user views the natural language translation as text via a display on the second user device. As a result, the method allows the second user to understand what the script is intended to do even though the second user may not understand the programming language.

Figure 4:
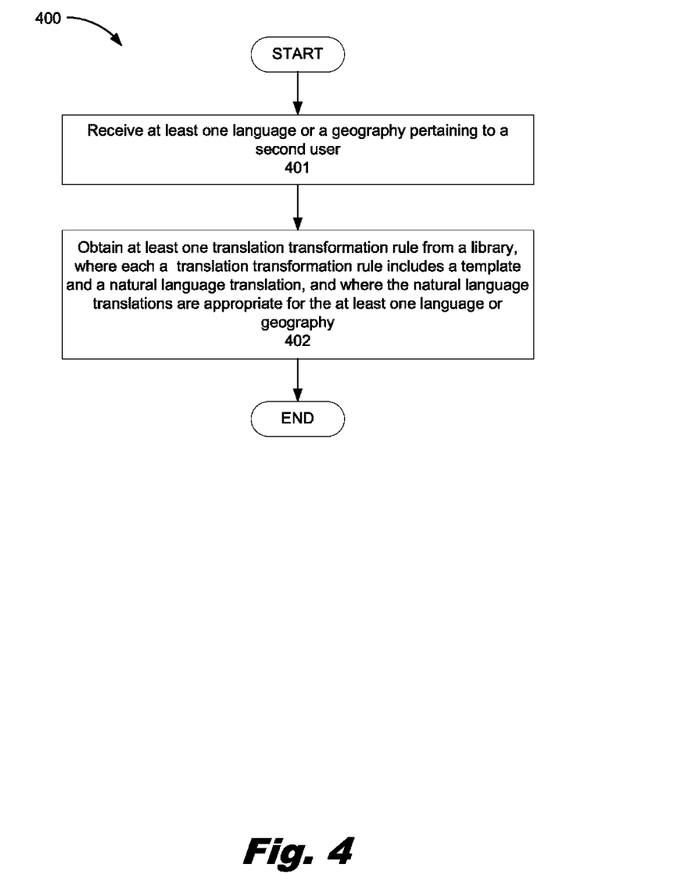
FIG. 4 is a flowchart of an example of a method for obtaining a translational transformation rule according to one example of principles described herein.

FIG. 4 is a flowchart of an example of a method for obtaining a translational transformation rule according to one example of principles described herein. In this example, the method (400) includes receiving (401) at least one language or a geography pertaining to a second user and obtaining (402) at least one translation transformation rule from a library where each a translation transformation rule includes a template and a natural language translation, and where the natural language translations are appropriate for the at least one of the language or the geography.

As mentioned above, the method includes receiving (401) at least one language or a geography pertaining to a second user. In one example the converting device may generate a natural language translation as text for an input script in a number of languages. In one example, the method (400) obtains rules that are specific to the language or geography of the second user. For example, if the second user is in Brazil and speaks Portuguese, the method (400) can use the translation rules to translate the input script to a Brazilian dialect of Portuguese.

Further, since users often set up their user devices with a language or geography, receiving (401) at least one language or a geography pertaining to a second user can include allowing a web site that the second user may visit to customize the response as suitable for that user. Further, translational transformation rules stored in a library are tagged with the language and geography for which they are most appropriate.

Further, the method can obtain (402) at least one translation transformation rule from a library where each a translation transformation rule includes a template and a natural language translation, and where the natural language translations are appropriate for the at least one of the language or the geography of the second user. As a result, the method (400) can later extract relevant translational transformation rules, and thereby an input script may be translated and displayed to a second user in a language appropriate for that user.

Figure 5:
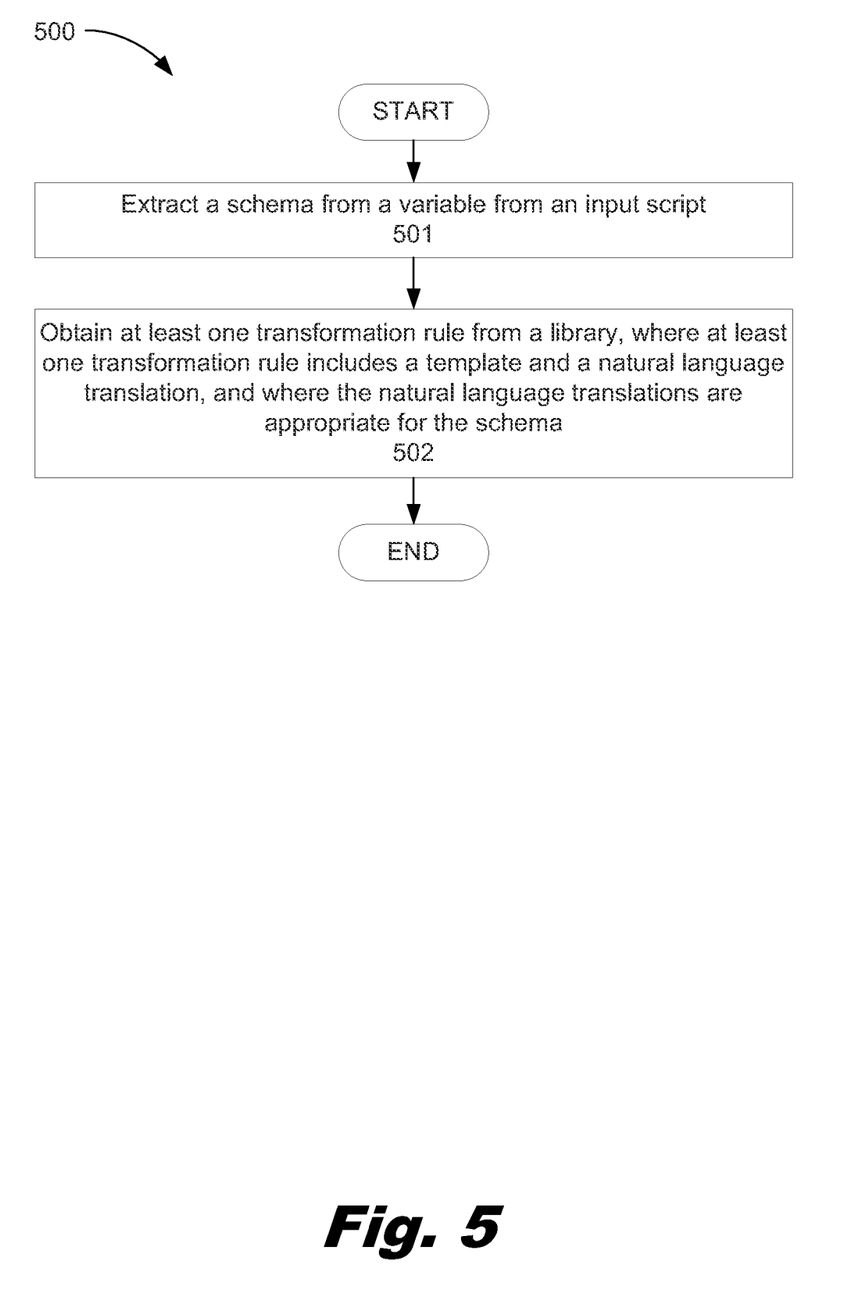
FIG. 5 is a flowchart of an example of a method for obtaining a translational transformation rule for a schema according to the principles described herein.

FIG. 5 is a flowchart of an example of a method for obtaining a translational transformation rule for a schema according to the principles described herein. In this example, the method (500) includes extracting (501) a schema from a variable from an input script and obtaining (502) at least one transformation rule from a library, where at least one transformation rule includes a template and a natural language translation, and where the natural language translations are appropriate for the schema.

As mentioned above, the method includes extracting (501) a schema from a variable from an input script. In one example, a schema for an input variable is often listed directly inside a LOAD statement. For example, an input script may be as follows:

```
Workers = FILTER People BY (yob == 1990) AND (name MATCHES 'Alejandro');
``` and the variable People may be recognized to have a "Person" schema because of the schema specified in a LOAD statement. In one example, the natural language translation as text of the input script without extracting a schema may be, "Computes Workers by finding People for which yob is 1990 and name is equal to 'Alejandro'." The natural language translation of the input script without extracting a schema may allow a user to understand the natural language translation. However, the natural language translation of the input script can be improved if the schema is recognized. In this example, the method (500) extracts the schema 'People' to allow the natural language translation as text to read, "Computes Workers by finding People who were born in 1980 and are named 'Alejandro'."

To extract the schema 'People' to allow the natural language translation as text to read, "Computes Workers by finding People who were born in 1980 and are named 'Alejandro'," the method (500) further includes obtaining (502) at least one transformation rule from a library, where at least one transformation rule includes a template and a natural language translation, and where the natural language translations are appropriate for the schema.

In this example, the method (500) can use a schema-specific template. For example, the schema-specific template may be as follows:

```
(STATEMENT ^1. Person (FILTER ^2 ^3)) → (Computes ^1 by finding ^2 who ^3)
(== Person.yob ^2) → (were born in ^2)
(MATCHES Person.name ^2) → (are named ^2)
```

As a result, the natural language translation as text reads, "Computes Workers by finding People who were born in 1980 and are named 'Alejandro'." Thus, a schema-specific template may be used to improve a natural language translation.

Figure 6:
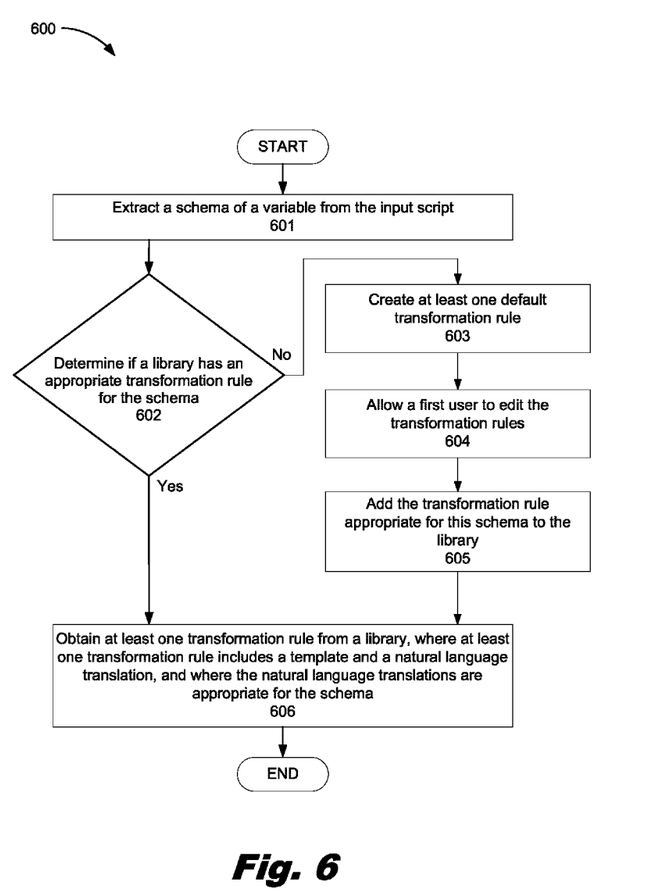
FIG. 6 is a flowchart of an example of a method for determining an appropriate translational transformation rule according to the principles described herein.

FIG. 6 is a flowchart of an example of a method for determining an appropriate translational transformation rule according to the principles described herein. In this example, the method (600) includes extracting (601) a schema of a variable from an input script, determining (602) if a library has an appropriate transformation rule for the schema, creating (603) at least one default transformation rule, allowing (604) a first user to edit the transformation rules, adding (605) the transformation rule appropriate for this schema to the library, and obtaining (606) at least one transformation rule from a library, where at least one transformation rule includes a template and a natural language translation, and where the natural language translations are appropriate for the schema.

As mentioned above, the method includes determining (602) if a library has an appropriate transformation rule for the schema. In one example, the method (600) checks if there is a translation transformation rule which matches a schema in a part of the folded tree starting at a particular node. Further, if the library has an appropriate transformation rule for the schema, the method includes obtaining (606) at least one transformation rule from a library, where at least one transformation rule includes a template and a natural language translation, and where the natural language translations are appropriate for the schema. If the library does not have an appropriate transformation rule for the schema, the method (600) then creates at least one default transformation rule.

In this example, creating (603) at least one default transformation rule includes a user entering details about the schema from the input script and adding the new transformation rule rules to the library. For example, the method (600) can ask the user for some additional descriptive text to describe the schema. For example, if the schema had a property Z, which a user named "zipcode", the method takes the common operation Z=<constant>, and generates a natural language translation such as, "where zipcode is <constant>". Further, the schema and the schema description are stored in the schema catalog so it is available to assist subsequent users.

As mentioned above, the method includes allowing (604) a first user to edit the transformation rules. In one example, a user edits the natural language translation until it looks correct according to the user. For example, the user may edit "where zipcode is <constant>" to "who reside in the <constant> zipcode". In this example, the user is injecting additional information that may not have been available in any machine-readable form.

The method further includes, adding (605) the transformation rule appropriate for this schema to the library. In one example, after the user has finished editing the schema, the resulting schema-specific translation is stored into the library. Further, to avoid many users having to renter details for many similar schemes, the method also creates a catalog of schemes. As a result, when a new schema is encountered, the method can suggest compatible schemes from the catalog and ask the user if any schemes in the library match the schemes in the input script.

Figure 7:
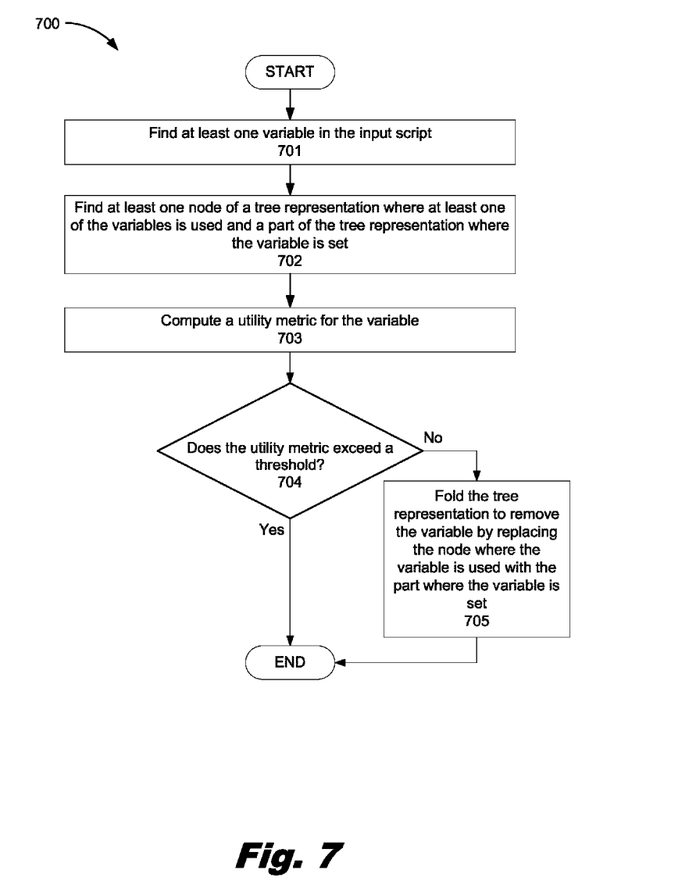
FIG. 7 is a flowchart of an example of a method for folding a tree according to the principles described herein.

FIG. 7 is a flowchart of an example of a method for folding a tree according to the principles described herein. In this example, the method (700) includes finding (701) at least one variable in the input script, finding (702) at least one node of a tree representation where at least one of the variables is used and a part of the tree representation where the variable is set, computing (703) a utility metric for the variable, determining (704) if the utility metric exceeds a threshold, and folding (705) the tree representation to remove the variable by replacing the node where the variable is used with the part where the variable is set.

As mentioned above, the method includes finding (701) at least one variable in the input script. As mentioned above, an input script may be in any language that contains variable assignments.

Further, as mentioned above, the method includes finding (702) at least one node of a tree representation where at least one of the variables is used and finding a part of the tree representation where the variable is set. In one example, the variable is set where the variable is defined.

The method further includes computing (703) a utility metric for the variable. In one example, a utility metric may be based on a score. In this example, the method can start with a utility metric of 0, indicating the utility metric is neutral, for all variables and add or subtract points based on a number of factors. In one example, a factor may include the usage of the variable in the input script, the text in a comment, and the characters in the variable name. For example, a script may contain the variable A. In this example, the variable A starts with 0 points by default. If variable A is used in a comment in the input script, variable A's score is increased by two points. Further, if variable A is used in a load statement in the input script, variable A's score is increased by one point. Still further, if variable A is used in a store statement in the input script, variable A's score is decreased by one point. Still further yet, if variable A is not in human readable from, variable A's score is decreased by two points. Further, if variable A is used more than one time in the input script, variable A's score is decreased by two points. Further, if variable A has very few characters in the input script, variable A's score is decreased by three points. As a result, a utility metric may be used to score a variable.

The method further includes, determining (704) if the utility metric exceeds a threshold. In the example given above, if variable A's utility metric exceeds –0, the method ends. Alternatively, if variable A's utility metric does not exceeds –0, the tree representation is folded to remove the variable. Further, a utility metric's threshold may be set to any appropriate threshold.

As mentioned above, the method includes folding (705) the tree representation to remove the variable by replacing the node where the variable is used with the part where the variable is set. In one example, the input script may be as follows:

```
m = LOAD 'input' USING PigStorage( ) AS (text:chararray,
timestamp:chararray);
SPLIT m INTO x IF timestamp matches 'today', y IF timestamp matches
'yesterday';
STORE x INTO 'output';
```

As mentioned above, the method (700) determines if the utility metric exceeds a threshold. In this example, variable 'm' has a utility metric of –4, variable 'y' has a utility metric of –5, variable 'x' has a utility metric of –6. As a result, the tree representation is folded to eliminate variables 'm', 'y', and 'x'. Further, the natural language translation as text for this particular input script is, "Writes out entries for which timestamp is equal to 'today'". In this example, the method does not translate the "IF timestamp matches 'yesterday'" portion of the script because the value of the variable 'y' is not stored by the input script and so the operation using variable y has no effect. Further, the method (700) can detect such cases during folding by looking for variables which are set but not used and removing that are set but not used. However if the script were instead:

```
messages = LOAD 'input' USING PigStorage( ) AS (text:chararray,
timestamp:chararray);
SPLIT messages INTO x IF timestamp matches 'today', y IF timestamp
matches 'yesterday';
STORE x INTO 'output';
``` then since the variable name is now messages', the variable has a sufficient utility metric to avoid folding, and thus the variable would not be folded. Consequently, the natural language translation for the script is:

Reads in messages. Writes out messages for which timestamp is equal to day.

Figure 8:
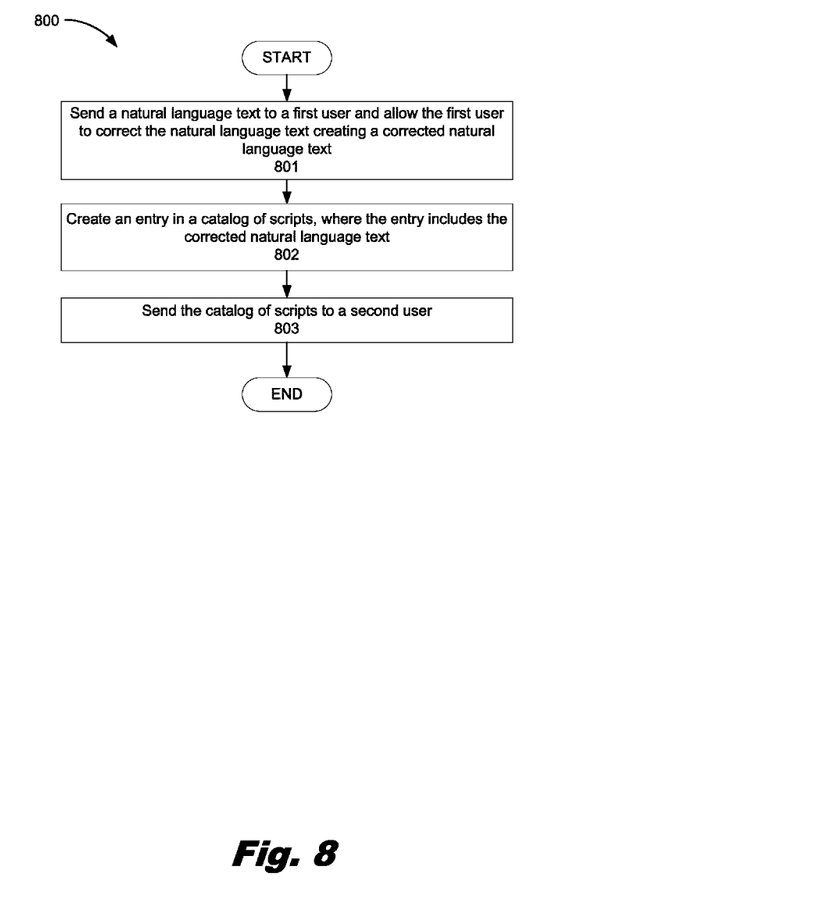
FIG. 8 is a flowchart of an example of a method for sending the natural language text to a second user device according to the principles described herein.

FIG. 8 is a flowchart of an example of a method for sending the natural language text to a second user device according to the principles described herein. In this example, the method (800) includes displaying (801) a natural language text to a first user and allow the first user to correct the natural language text creating a corrected natural language text, creating (802) an entry in a catalog of scripts, where the entry includes the corrected natural language text, and sending (803) the catalog of scripts to a second user.

As mentioned above, the method includes sending (801) a natural language text to a first user and allowing the first user to correct the natural language text by creating a corrected natural language text. In one example, the first user that uploaded the input script may be able to provide a much more readable description for the natural language text. For example, a natural language translation may be sent to a first user using a first user device that states, "Compute 10 plus 1 and store the answer in Result." In this example, the first user corrects the natural language translation to state, "Force the result to be one more than the default value of 10." As a result, the first user may correct the natural language text to add additional information to further clarify the natural language translation text. Further, in this example, a corrected translation transformation rule replaces the translation transformation rule in the library to minimize having a user correct the natural language text in subsequent operations. Further, even if the user ultimately types in a much better description, it is still preferable to generate the natural language text in an automated manner first since it is easier for a user to edit the natural language translation text than to write the natural language translation text from scratch and additionally, it is more likely to be correct if the user edits a translation which is initially correct rather than typing from scratch or copying a description from elsewhere.

The method further includes creating (802) an entry in a catalog of scripts, where the entry includes the corrected natural language text. In one example, a catalog of scripts is created and stored in a library. Further, the library has a natural language description for each catalog entry. As a result, the method (800) can allow users to search catalog scripts by entering search terms. More detail about entering search items will be described in later parts of this specification.

Finally, the method includes sending (803) the catalog of scripts to a second user. As mentioned above, the method (800) can allow users to search catalog scripts by entering search terms. In one example, the method (800) sends all the relevant catalog of scripts to a second user when a user searches the catalog scripts by entering search terms. In another example, the method (800) sends a select number of the relevant catalog of scripts to a second user. Further, the second user views the natural language text via a display on the second user device. More detail about sending the catalog of scripts to a second user will be described in later parts of this specification.

Figure 9:
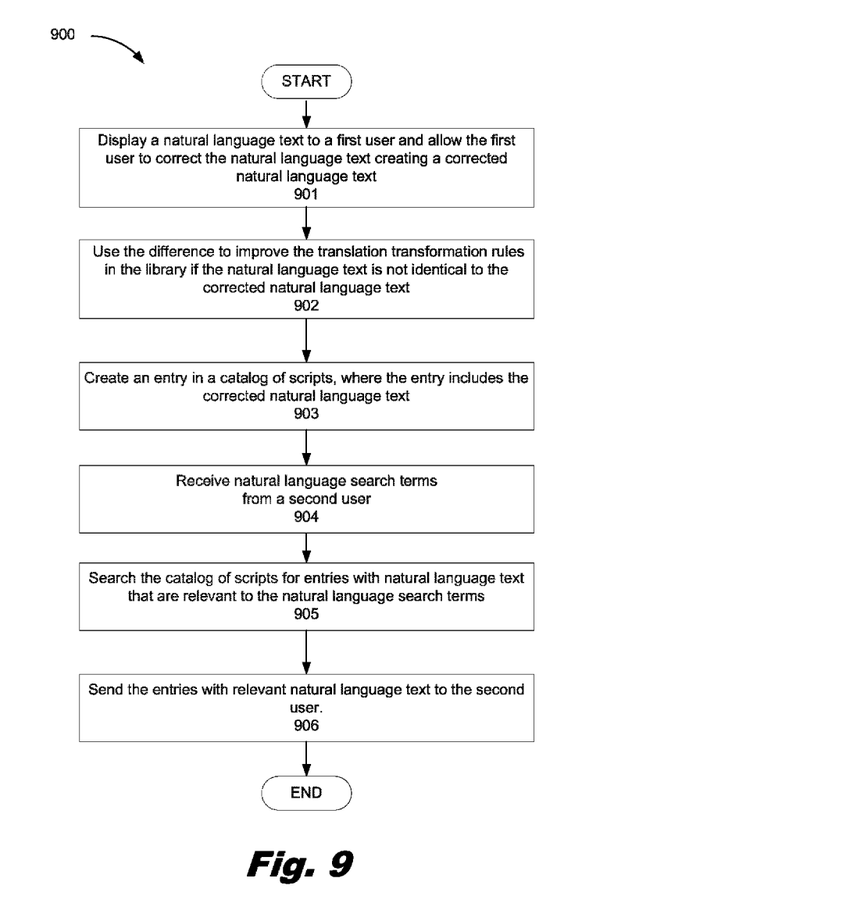
FIG. 9 is a flowchart of an example of a method for sending the natural language text to a second user device according to the principles described herein.

FIG. 9 is a flowchart of an example of a method for sending the natural language text to a second user device according to the principles described herein. In this example, the method (900) includes displaying (901) a natural language text to a first user and allow the first user to correct the natural language text creating a corrected natural language text and using (902) the difference to improve the translation transformation rules in the library if the natural language text is not identical to the corrected natural language text. The method (900) further includes creating (903) an entry in a catalog of scripts, where the entry includes the corrected natural language text, receiving (904) natural language search terms from a second user, searching (905) the catalog of scripts for entries with natural language text that are relevant to the natural language search terms, and sending (906) the entries with relevant natural language text to the second user.

As mentioned above, the method includes using (902) the difference to improve the translation transformation rules in the library if the natural language text is not identical to the corrected natural language text. A first user that uploaded an input script may be able to provide a much more readable description for the natural language text. For example, a natural language translation may be sent to a first user using a first user device that states, "Compute 10 plus 1 and store the answer in Result" In this example, the first user corrects the natural language translation to state, "Compute 10 plus one and store the answer in the variable Result" As a result, the translation transformation rule for this script is improved by using the difference in the translation transformation rule in the library and correcting the translation transformation rule to create a correct natural language text.

Additionally, editing operations performed by many users may similarly be analyzed. Further, changes to the transformation rules are made to minimize the number of editing operations that users would perform if the same input scripts were reprocessed.

The method further includes receiving (904) natural language search terms from a second user. As mentioned above, the library has a natural language description for each catalog entry. As a result, a second user can search the catalog scripts by entering search terms. For example, a second user may search the catalog scripts by entering search terms such as, "compute ten plus one," In keeping with the given example, a webpage is displayed to the second user on a second user device via a display. In this example, the webpage allows the user to type the search terms "compute", "ten", "plus", and "one" into the webpage. Further, a converting device may access the search items on the webpage over a network (103). As a result, the search terms "compute", "ten", "plus", and "one" are received from the second user.

After the search items are received, the method (900) further includes searching (905) the catalog of scripts for entries with natural language text that are relevant to the natural language search term. In keeping with the given example, the catalog of scripts are searched for entries that include terms such as "compute", "ten", "plus", and "one".

While this example has been described with reference to four search terms, any appropriate number of search terms may be entered. Further, a search term may be a sentence, a word, a character, and combinations thereof. In addition, while this example has been described with reference to a single natural language translation, the natural language translation of a script may contain several variations. For example, a natural language of a script may be in different languages. Further, a natural language of a script may be with or without the natural language translations specific to a particular schema.

Figure 10:
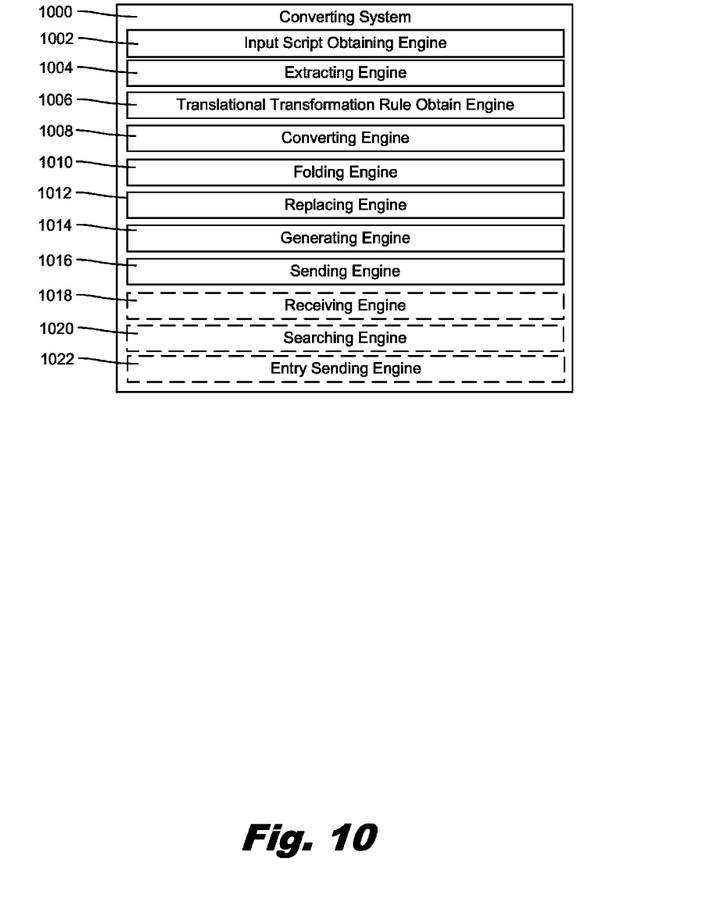
FIG. 10 is a diagram of an example of a converting system according to the principles described herein.

FIG. 10 is a diagram of an example of a converting system (1000) according to the principles described herein. The converting system (1000) includes an input script obtaining engine (1002), an extracting engine (1004), a translation transformation rule obtaining engine (1006), a converting engine (1008), a folding engine (1010), replacing engine (1012), a generating engine (1014), and a sending engine (1016). In this example, the converting system (1000) also includes a receiving engine (1018), a searching engine (1020), and an entry sending engine (1022). The engines (1000, 1002, 1004, 1006, 1008, 1010, 1012, 1014, 1016, 1018, 1020, 1022) refer to a combination of hardware and program instructions to perform a designated function. Each of the engines (1000, 1002, 1004, 1006, 1008, 1010, 1012, 1014, 1016, 1018, 1020, 1022) may include a processor and memory. The program instructions are stored in the memory and cause the processor to execute the designated function of the engine.

The input script obtaining engine (1002) obtains an input script comprising at least one variable. In one example, input script obtaining engine (1002) may obtain a Pig script. Further, the input script may be obtained from a first user using a first user device. In one example, the first user using the first user device may type an input script into a webpage. Further, the input script obtaining engine (1002) may obtain the input script from the webpage.

The extracting engine (1004) extracts a schema from at least one variable in the input script. In one example, the extracting engine (1004) extracts one variable from the input script. In another example, the extracting engine (1004) extracts any appropriate number of variables from the input script.

The translation transformation rule obtaining engine (1006) obtains at least one translation transformation rule from a library. In one example, the translation transformation rule obtaining engine (1006) obtains one translation transformation rule from the library that matches the input script. In another example, the translation transformation rule obtaining engine (1006) obtains any appropriate number of translation transformation rules from the library that matches the input script.

The converting engine (1008) converts the input script into a tree representation. In one example, the converting engine (1008) converts a part of input script into a tree representation. In another example, the converting engine (1008) converts all parts of input script into a tree representation.

The folding engine (1010) folds the tree representation to hide a subset of variables in the input script to create a folded tree. In one example, the folding engine (1010) folds the tree representation to hide one variable in the input script to create a folded tree. In another example, the folding engine (1010) folds the tree representation to hide all variables in the input script to create a folded tree The replacing engine (1012) replaces a matching part of the folded tree with a natural language translation from the translation transformation rule. In one example, the replacing engine (1012) replaces one matching part of the folded tree with a natural language translation from the translation transformation rule. In another example, the replacing engine (1012) replaces any appropriate number of matching parts of the folded tree with a natural language translation from the translation transformation rule.

The generating engine (1014) generates the natural language text. In one example, the generating engine (1014) extracts the natural language text from the folded tree.

The sending engine (1016) sends a natural language text. In one example, a second user views the natural language text via a display (110) on the second user device (109).

The receiving engine (1018) receives at least one language or a geography pertaining to a second user device. In one example, a translation transformation rule includes a template and a natural language translation. Further, the natural language translation is appropriate for at least one language or geography pertaining to the second user device.

The searching engine (1020) searches a catalog of scripts for entries with natural language text that is relevant to a natural language search term. In one example, the entries with the natural language text are relevant to a natural language search term are sent to a second user device.

The entry sending engine (1022) sends an entry with a natural language text that is relevant to a natural language search term to a second user device. In one example, the entry sending engine (1022) sends one entry to a second user device. In another example, the entry sending engine (1022) send more than one entry to a second user device.

Figure 11:
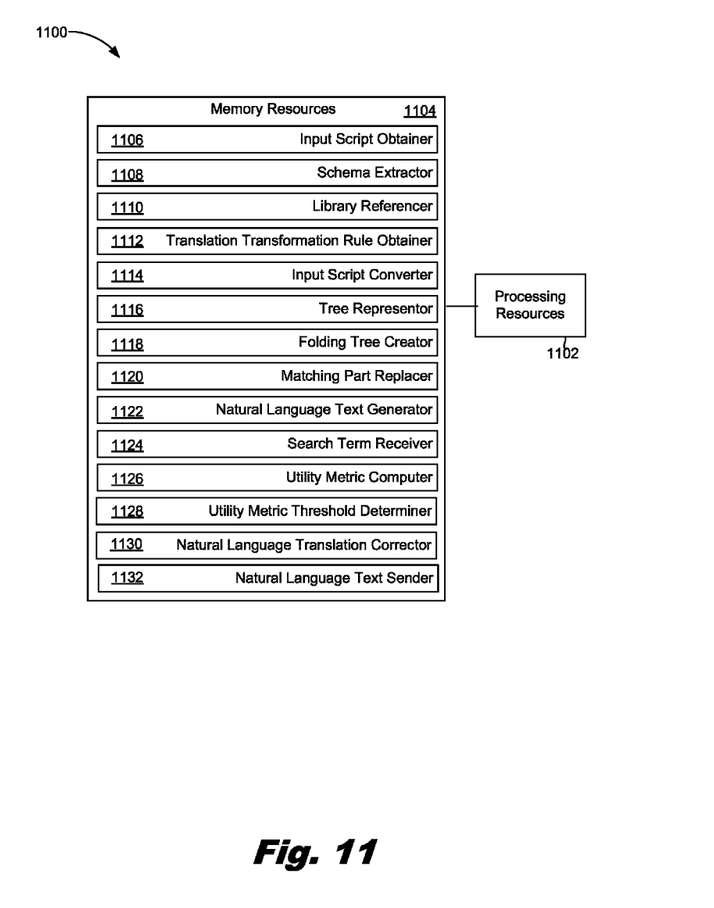
FIG. 11 is a diagram of an example of a converting system according to the principles described herein.

FIG. 11 is a diagram of an example of a converting system according to the principles described herein. In this example, converting system (1100) includes processing resources (1102) that are in communication with memory resources (1104). Processing resources (1102) include at least one processor and other resources used to process programmed instructions. The memory resources (1104) represent generally any memory capable of storing data such as programmed instructions or data structures used by the converting system (1100). The programmed instructions shown stored in the memory resources (1104) include an input script obtainer (1106), a schema extractor (1108), a library referencer (1110), a translation transformation rule obtainer (1112), an input script converter (1114), a tree representor (1116), a folding tree creator (1118), a matching part replacer (1120), a natural language text generator (1122), a search term receiver (1124), a utility metric computer (1126), a utility metric threshold determiner (1128), a natural language translation corrector (1130), a natural language text sender (1132).

The memory resources (1104) include a computer readable storage medium that contains computer readable program code to cause tasks to be executed by the processing resources (1102). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The input script obtainer (1106) represents programmed instructions that, when executed, cause the processing resources (1102) to obtain an input script from a first user. The schema extractor (1108) represents programmed instructions that, when executed, cause the processing resources (1102) to extract a schema from the input script. The library referencer (1110) represents programmed instructions that, when executed, cause the processing resources (1102) to reference a library containing a number of translation transformation rule and catalog entries. The translation transformation rule obtainer (1112) represents programmed instructions that, when executed, cause the processing resources (1102) to obtain a translation transformation rule from the library. The input script converter (1114) represents programmed instructions that, when executed, cause the processing resources (1102) to convert the input script to a tree representation. The tree representor (1116) represents programmed instructions that, when executed, cause the processing resources (1102) to represent the input script as a tree. The folding tree creator (1118) represents programmed instructions that, when executed, cause the processing resources (1102) to create a folded tree to hide a subset of variables in the input script.

The matching part replacer (1120) represents programmed instructions that, when executed, cause the processing resources (1102) to replace a matching part of a tree representation of the input script with a natural language translation. The natural language text generator (1122) represents programmed instructions that, when executed, cause the processing resources (1102) to generate a natural language text. The search term receiver (1124) represents programmed instructions that, when executed, cause the processing resources (1102) to receive search terms from a second user using a second user device. The utility metric computer (1126) represents programmed instructions that, when executed, cause the processing resources (1102) to compute a utility metric for a variable in the input script. The utility metric threshold determiner (1128) represents programmed instructions that, when executed, cause the processing resources (1102) to determine a utility metric threshold for a variable in the input script. The natural language translation corrector (1130) represents programmed instructions that, when executed, cause the processing resources (1102) to correct natural language translation of a generated natural language text. The natural language text sender (1132) represents programmed instructions that, when executed, cause the processing resources (1102) to send the natural language text to a second user using a second user device.

Further, the memory resources (1104) may be part of an installation package. In response to installing the installation package, the programmed instructions of the memory resources (1104) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In so rye examples, the processing resources (1102) and the memory resources (1104) are located within the same physical component, such as a server, or a network component. The memory resources (1104) may be part of the physical component's main memory, caches, registers, non-volatile memory, or elsewhere in the physical component's memory hierarchy. Alternatively, the memory resources (1104) may be in communication with the processing resources (1102) over a network. Further, the data structures, such as the libraries, may be accessed from a remote location over a network connection while the programmed instructions are located locally. Thus, the converting system (1100) may be implemented on a user device, on a server, on a collection of servers, or combinations thereof.

The converting system (1100) of FIG. 11 may be part of a general purpose computer. However, in alternative examples, the converting system (1100) is part of an application specific integrated circuit.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, a processor of the converting system (FIG. 1, 105) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for converting an input script, the method comprising:
obtaining an input script comprising at least one variable;
obtaining at least one translation transformation rule from a library;
converting the input script into a tree representation;
folding the tree representation to hide a subset of variables in the input script to create a folded tree; and
generating a natural language text by applying at least one translation transformation rule from the library to the folded tree.

2. The method of claim 1, in which folding the tree representation to hide the subset of the variables in the input script to create a folded tree comprises replacing a node of the tree representation in which a variable is used with a part of the tree representation in which the variable is defined.

3. The method of claim 2, comprising:
generating a natural language translation by applying the translation transformation rule to the at least one part of the folded tree; and
replacing the at least one part of the folded tree with the natural language translation.

4. The method of claim 1, in which obtaining the at least one translation transformation rule from the library further comprises receiving at least one language or a geography pertaining to a second user device, in which the at least one translation transformation rule comprises a template and a natural language translation, in which the natural language translation is appropriate for the at least one language or the geography pertaining to the second user device.

5. The method of claim 1, in which obtaining the at least one translation transformation rule from the library further comprises extracting a schema from the at least one variable in the input script from a first user device and obtaining at least one transformation rule from the library, in which the at least one transformation rule comprises a template and a natural language translation, in which the natural language translation is appropriate for the schema.

6. The method of claim 1, further comprising:
sending the natural language text to a first user to allow the first user to correct the natural language text to create a corrected natural language text; and
modifying at least one translation transformation rule in the library based on a difference between the natural language text and the corrected natural language text.

7. The method of claim 5, further comprising:
generating at least one default translation transformation rule relevant to the schema if there is not an appropriate translation transformation rule for the schema in the library;
allowing the first user to correct the at least one default translation transformation rule to create a schema-specific translation transformation rule; and
storing the schema-specific translation transformation rule in the library.

8. The method of claim 1, further comprising
searching a catalog of scripts for entries with natural language text that are relevant to a natural language search term; and
sending the entries to a second user device.

9. A system for converting an input script, the system comprising:
an input script obtaining engine to obtain an input script comprising at least one variable;
an extracting engine to extract a schema from the at least one variable in the input script;
a translation transformation rule obtaining engine to obtain at least one translation transformation rule from a library;
a converting engine to convert the input script into a tree representation;
a folding engine to fold the tree representation to hide a subset of variables in the input script to create a folded tree;
a replacing engine to replace a matching part of the folded tree with a natural language translation from the translation transformation rule;
a generating engine to generate the natural language text by applying at least one translation transformation rule from the library to the folded tree; and
a sending engine to send the natural language text.

10. The system of claim 9, in which replacing the at least one part of the folded tree with the natural language translation further comprises replacing a node of the tree representation in which a variable is used with a part of the tree representation in which the variable is defined.

11. The system of claim 9, further comprising a receiving engine to receive at least one language or a geography pertaining to a second user device, in which the at least one translation transformation rule comprises a template and a natural language translation, in which the natural language translation is appropriate for the at least one language or the geography pertaining to the second user device.

12. The system of claim 9, further comprising
a searching engine to search a catalog of scripts for entries with natural language text that are relevant to a natural language search term; and
an entry sending engine to send the entries to a second user device.

13. A computer program product for converting an input script, comprising:
a non-transitory tangible computer readable storage medium, the tangible computer readable storage medium comprising computer readable program code embodied therewith, the computer readable program code comprising program instructions that, when executed, causes a processor to:
obtain an input script comprising at least one variable;
convert the input script into a tree representation;
fold the tree representation to hide a subset of variables in the input script to create a folded tree; and
generate a natural language text by applying at least one translation transformation rule from a library to the folded tree.

14. The system of claim 13, further comprising computer readable program code comprising program instructions that, when executed, cause the processor to compute a utility metric for the at least one variable to determine if the utility metric for the at least one variable exceeds a threshold, in which the threshold determines if the tree representation is to be folded to remove the at least one variable by replacing a node of the tree representation in which a variable is used with a part of the tree representation in which the variable is defined.

15. The system of claim 13, further comprising computer readable program code comprising program instructions that, when executed, cause the processor to accept input from a first user to correct the natural language text creating a corrected natural language text, and to create an entry comprising the corrected natural language text in a catalog of scripts.

* * * * *